United States Patent [19]

Duce

[11] Patent Number: 4,875,416
[45] Date of Patent: Oct. 24, 1989

[54] ENDLESS PATH STORAGE CAROUSEL WITH SELECTIVE DISCHARGE

[75] Inventor: Edward Duce, West Yorkshire, England

[73] Assignee: Stockrail Ltd., West Yorkshire, England

[21] Appl. No.: 145,360

[22] Filed: Jan. 19, 1988

[51] Int. Cl.[4] .............................................. B61B 13/00
[52] U.S. Cl. ................................. 104/167; 198/465.4; 198/580; 198/360; 198/666
[58] Field of Search ................... 104/167, 103; 198/465.4, 467.1, 580, 360, 548, 667, 668, 659

[56] References Cited

U.S. PATENT DOCUMENTS

| | | | |
|---|---|---|---|
| 352,834 | 11/1886 | Moyer | 104/103 |
| 2,620,917 | 12/1952 | Dahlberg | 104/167 |
| 2,908,379 | 10/1959 | Hamilton | 104/167 X |
| 2,947,407 | 8/1960 | Wood | 198/360 |
| 3,178,012 | 4/1965 | Weiss et al. | 198/659 |
| 3,415,352 | 12/1968 | Gerisch | 198/465.4 X |
| 3,541,724 | 11/1970 | Einfalt | 104/167 |
| 3,550,169 | 12/1970 | Forse | 198/465.4 X |
| 3,734,026 | 5/1973 | Saito | 104/167 |

FOREIGN PATENT DOCUMENTS

| | | | |
|---|---|---|---|
| 661754 | 7/1965 | Belgium | 198/659 |
| 606590 | 10/1960 | Canada | 198/659 |
| 1507922 | 1/1970 | Fed. Rep. of Germany | 104/167 |

*Primary Examiner*—Johnny D. Cherry
*Assistant Examiner*—Gary C. Hoge
*Attorney, Agent, or Firm*—Klauber & Jackson

[57] ABSTRACT

A live storage carousel for garment hangers, or the like comprises two scroll conveyors arranged in spaced, vertical and parallel planes. The scroll conveyors are oppositely and equally angled and gravity guides connect adjacent upper and lower ends of the respective scroll conveyors to form an endless path. The scroll conveyors are driven by a flexible drive cable so that the hangers are elevated by the conveyors and then slide down the guides to the lower ends of the conveyors. One of the guides can be broken at will to divert one or more hangers from the carousel onto, for example, an output conveyor.

8 Claims, 1 Drawing Sheet

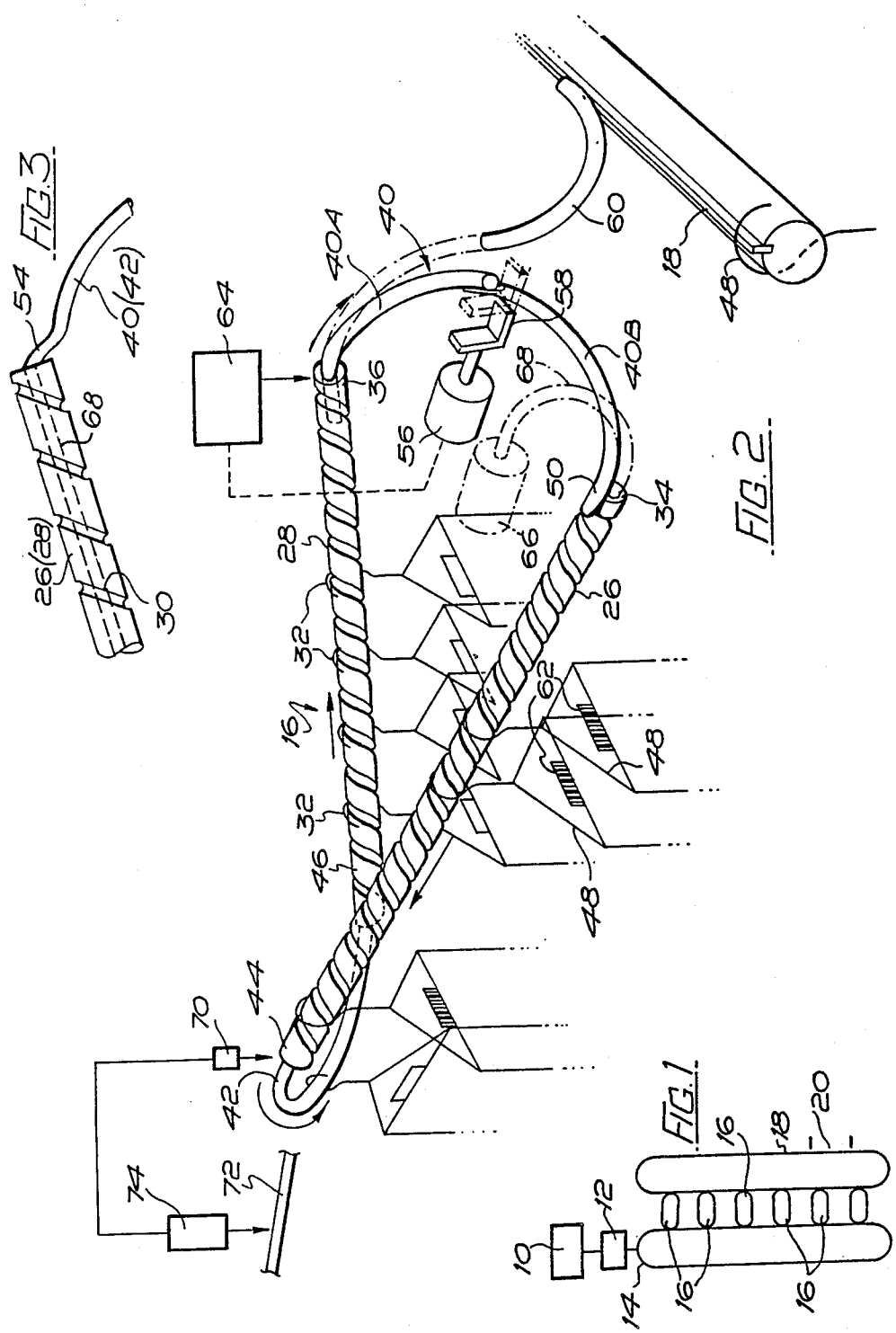

ENDLESS PATH STORAGE CAROUSEL WITH SELECTIVE DISCHARGE

This invention relates to live storage devices, referred to in the particular industry with which the present invention has specific connection, as "carousels".

In the mass production and handling of garments there is a need to have storage devices for individual garments suspended upon hangers, and such storage devices are required to be "live" which means that the storage device has to have a moving part or section whereby the suspended garments travel in a predetermined path. Typically, such a storage device may comprise a circular storage rail which rotates about a vertical axis, hence the description "carousel".

These live storage devices are required for the transporting of the individual, suspended garments from say an input location whereat the individual garments are loaded on the carousel, and an output location from which individual garments are picked. Assume therefore that a carousel is provided with a large number of individual garments in groups of different types, and it is required to pick a selection of the garments from the carousel say to provide a specific order for a shop or department store, an operator will pick the individual garment types from the carousel and place them on an output conveyor mechanism as a group, so that that group subsequently can be taken to a transportation vehicle for delivering to the eventual customer. It is to be appreciated that the above description as applied to a single group of garments to satisfy an order is given to indicate how the garments are handled, but in practice the numbers involved are vast, and operators make up large numbers of groups of garments for customer orders, especially where the orders might be for large chain stores.

There is a need for an effective live storage carousel which will operate simply and reliably, and the present invention seeks to provide such a carousel. The difficulty with the circular carousel described is that to lift individual garment hangers from a circular carousel requires the individual garment hangers in some way to be lifted so that the hook portion of the hanger will clear the circular carousel rail. This requires a lifting mechanism or as is more usually the case in practice, the presence of an operator who will lift the individual hangers manually from the carousel and place them on an output conveyor. Because of this, the circular carousel arrangement does not lend itself to automatic picking which comprises picking of respective garments from the carousel in accordance with a pre-programmed instruction without requiring the presence of a manual worker.

The present invention provides a live storage carousel which, although in this specification reference is mainly made to the garment handling industry, can be used in any application requiring the live suspension and storage of articles, components, food products and the like.

In accordance with the present invention a live storage carousel comprises means defining an endless path by which and along which suspension hangers are supported and moved, said endless path comprising a first scroll conveying means arranged so that one end is higher than the other and the scroll conveyor means is driven so as to drive the hangers from the lower end to the upper end and either a gravity return portion connecting the upper end of the first scroll conveyor to the lower end whereby hangers which pass to the upper end of the first scroll conveyor will fall by gravity back to the lower end of the first scroll conveyor to be picked up and re-elevated thereby, or the presence in the continuous path of at least a second scroll conveyor arranged so that one end is higher than the other and so that hangers can be elevated from the lower ends to the upper ends of the scroll conveyors and in other regions will fall by gravity so that the one or two or more scroll conveyors continuously move the hangers around the endless path.

By this means, the hangers are kept constantly in motion, and as there will be portions of the endless path down which the hangers slide by gravity, it is a simple matter to provide a gate or break or other means in said portion to deflect the hangers out of the endless path and for example on to a guide which directs the gravity falling hangers on to for example an output conveyor.

One method of achieving this is to provide that, in the said gravity falling portion of the endless path, two guide rail sections overlap vertically, and the uppermost section is deflectible to a position for deflecting the hangers out of the endless path on to a guide rail by which the hangers can be fed under gravity to an output conveyor.

In a particularly suitable embodiment, two scroll conveyors are used and they lie in parallel vertical planes, their lower ends are at the same level as are their upper ends, and the conveyors are connected in series with the upper end of the conveyor being coupled by a curved gravity guide rail to the lower end of the other conveyor whereby the carousel defines an elongated and endless loop. The scroll conveyors may be driven by means of an electric motor and a flexible drive rod which engages an end of at least one of the conveyors, and preferably passes through said one conveyor and is drivingly connected to the other conveyor. One of the curved gravity guide rails preferably is in two parts, a first part extending from an upper end of one conveyor to a position overlapping an end of the other part, which other part leads to the lower end of the conveyor and overlaps same, so that as the hangers drop from said other part, they fall on to the lower end of the scroll conveyor.

Such a carousel is extremely useful in a large garment hanging warehouse from which orders are made up. Such a warehouse may comprise an input conveyor which receives a bulk supply of garments suspended on hangers, and from which the individual garments are fed to carousel arrangements according to the invention and from these carousel arrangements, individual orders can be automatically picked in that if each garment hanger carries a unique coding arrangement, such as a bar code flag identifying the garment carried thereby, the sensing of these flags can control the operation of the carousel discharge device enabling the garments to be discharged from the carousel devices in a pre-selected picking order to make up customer order groups of garments on a main output conveyor.

An embodiment of the present invention will now be described, by way of example, with reference to the accompanying diagrammatic drawings, wherein:

FIG. 1 is a plan view of a garment warehouse for storage and distribution of individual hanger suspended garments;

FIG. 2 is a perspective elevation showing one form of a carousel device according to the invention; and FIG. 3 is a side view of a detail of a carousel device shown in FIG. 2.

Referring to the drawings, in FIG. 1 there is shown the layout of a garment storage warehouse for the storing and handling of garments suspended individually on hangers. Reference numeral 10 indicates a delivery section of the warehouse where the garments hanging on individual hangers arrive, whilst reference 12 indicates a quality control section whereat the garments are examined for quality and then either rejected or allowed to pass to a long input conveyor 14 on which the garments are stored. The input conveyor 14 may be of the type described in our co-pending application No. 8416364 by which the garments suspended from the garment hangers are transported continuously around the endless track defined by the conveyor. The individual garments are then loaded on to individual storage carousels 16 according to the present invention each defining in plan view an endless loop extending between the loading conveyor and the output conveyor 18. The carousel storage conveyors 16 are live insofar as they are continuously driven so that the individual garments hanging thereon by means of the hangers are continuously circulated around the endless path defined by each carousel.

The garments are transferred from the carousel conveyors by selection or picking so as to be arranged in order groups on the output conveyors and are taken from an output station 20 of the output conveyors 18, which may also be as described in our co-pending application No. 8416364, to meet customers' orders.

FIG. 2 shows in perspective view one of the carousel conveyors 16 shown in FIG. 1, and it will be seen to comprise two scroll conveyors 26, 28 being in the form of straight rod assemblies each made up of a drive rod 68 on which are slid individual sections of scroll conveyor, the sections having scroll grooves which are aligned to provide a continuous scroll drive groove 30 (FIG. 3) for receiving the garment hanger hooks 32. Each scroll conveyor 26, 28 is arranged at an angle to the horizontal as shown, but they are inclined in opposite directions and lie on the respective sides of the conveyor loops so that the lower end 34 of the first scroll conveyor 26 is at the same end of the carousel loop as the upper end 36 of the second scroll conveyor 28, and the adjacent ends of the respective scroll conveyors are coupled by stationery curved guide arrangements 40, 42. In the case of the input end of the carousel, the guide 42 is a tube which curves from the top end 44 of the first scroll conveyor 26 to the lower end 46 of the second scroll conveyor 28 so as to provide a smooth gravity slide path for hangers such as the hangers 48 shown, whereby as each hanger 48 is ejected from the top 44 of the first conveyor it slides smoothly down the guide 42 to the lower end 46 of the second scroll conveyor 28 to be drivingly engaged thereby and so elevated by the second scroll conveyor 28 to the upper end 36 of the second scroll conveyor 28 from whence it is ejected on to a second curved guide 40 leading from the upper end 36 of the second scroll conveyor 28 to the lower end 34 of the first scroll conveyor 26 and again providing a means down which hangers 48 will side. Therefore, as the scroll conveyors are driven, hangers 48 are constantly raised from one end of a scroll conveyor to the other and then slide by gravity down the appropriate guide 40, 42 to the lower end of the other scroll conveyor.

In the case of the guide 40 of the output end of the carousel, this is in two parts comprising a first part 40A leading from the upper end 36 of the second scroll conveyor 28 ot a location approximately mid-way of the guide 40 where it overlaps the second part 40B of the guide without being connected to same, and the second part 40B of the guide runs from under the end of the first part 40A to a position overlying the lower end 34 of the first conveyor 26. The hangers 48 in sliding down this guide 40 will therefore slide down the first part 40A and drop from the free end of the first part 40A on to the second part 40B, will slide down the second part 40B, and eventually will drop from the end 50 of the second part 40B on to the scroll conveyor 28 to be picked up thereby and elevated to the upper end 44 of the scroll conveyor 28.

The arrangement at the upper end of each of the scroll conveyors is shown in FIG. 3, and the design is such that the guide 40, 42 which connects the upper end 44 or 36 of the scroll conveyor is provided with a short acceleration section 54 which is a short straight portion inclined downwardly at an angle of say 45° so that as each hanger 48 leaves the scroll conveyor 26, 28, it will fall on to the acceleration section 54 and be accelerated away from the end of the conveyor by the effect of gravity on the said acceleration section 54.

In order to remove garments from the live storage carousel 16, there is provided an air cylinder 56 of which the piston is connected by a suitably shaped bracket 58 to the free end of the first guide part 40A, such guide being for example of steel rod of a diameter of the order of 0.375 to 0.5 inch and of sufficient resiliency so that the free end can be displaced by the air cylinder 56 to the dotted line position in which the free end is clear of the lower part of the guide, and in fact is in a position overlapping a discharge guide 60 onto which the hangers 48 will pass in leaving the displaced end of the upper guide part 40A, whereby the hangers will be charged on to the main output conveyor 18. The selection of garments to be discharged can be made on an individual basis if each hanger carries, for example, a code recognition flag 62 unique to that garment, which can indicate type, size, colour and any other specific detail such as short sleeves or long sleeves as may be required. A sensing means 64 is arranged to read the code flag 62 which may be in bar code and upon detection of the garment type to be ejected, for example a position at the top of the second scroll conveyor, the air cylinder 56 is actuated displacing the end of the upper guide part 40A to the discharge position allowing the hanger to slide on to the discharge guide 60 and eventually on to the output conveyor 18.

The scroll conveyors are driven by means of an electric or other motor 66 connected by a drive rod 68 of flexibility sufficient to take up the curvature as shown, the drive rod 68 extending drivingly through the first conveyor 26, and the input end guide tube 42, so as to drivingly connect to the second scroll conveyor 28. By the arrangement shown in the drawings, the drive rod will not interfere with the hanger movement on the carousel. It is also to be appreciated that the scroll conveyors 26, 28 will be provided with suitable framework enabling the mounting of same, and also enabling the mounting of the motors 56, 66 and any sensing devices which are required for sensing the flag 62 carried by the hangers.

In the complete installation, involving coding of the hangers as illustrated, computer control can be exercised so as to monitor and keep control of every garment in the system. The information can be also used electronically and easily to provide stock control and the making up of individual orders as required. The computerisation of the control of the movement of the garments may further include a means 70 for sensing, before loading an additional garment on to the input end 42 of the carousel for example by means of a chute 72 the presence or absence of a hanger at the top end of conveyor 26 before opening a gate 74 controlled by the sensor 70 to allow any further hangers 48 with garments to be added to the carousel.

Typically, a carousel may be 20 to 50 feet in length, giving 40 to 100 feet of storage space, and if the scroll groove 30 is of 1 inch pitch, then the system can carry 120 hangers per 10 foot length.

By using the gravity slide guides 40, 42 at the ends of the scroll conveyors 26, 28, it is ensured that the individual hangers 48 will accelerate along the guide and therefore there will be no bunching of the hangers in the regions of the guides 40, 42.

Modifications of the concept may be made. For example it is possible to provide a carousel with only one elevating scroll conveyor, the remainder of the carousel comprising gravity slide guide means, or the carousel may be provided with more than one scroll conveyor.

Additionally, it is possible to provide an elevating scroll conveyor in any live hanging suspension system, such as the input conveyor or output conveyor of the arrangement shown.

I claim:

1. A live storage carousel comprising:
   (a) means defining an endless path along which suspension hangers are supported and moved,
   (b) a scroll conveyor forming part of said endless path and having an upper end and a lower end,
   (c) means for driving the carousel so that the hangers are driven from the lower end to the upper end of said scroll conveyor,
   (d) gravity return means forming part of said endless path and extending from said upper end of said scroll conveyor, and
   (e) selectively operable discharge means forming part of said gravity return means for selectively discharging said hangers out of the endless path and from the carousel dependent upon the operation of said discharge means as the hangers travel on said gravity return means.

2. A carousel according to claim 1, wherein said endless path further includes a second scroll conveyor having an upper end and a lower end, and a second gravity return means between the upper end of the second scroll conveyor and lower end of the first mentioned scroll conveyor, said first mentioned gravity return means connecting the upper end of the first mentioned scroll conveyor and the lower end of the second scroll conveyor.

3. A carousel according to claim 1, wherein said gravity return means comprises an uppermost section and a lowermost section which sections overlap vertically and the discharge means is adapted to deflect the uppermost section to a position for deflecting the hangers out of the endless path on to a guide rail by which the hangers can be fed under gravity to an output conveyor.

4. A carousel according to claim 2, wherein said two scroll conveyors lie in parallel vertical planes, their lower ends are at the same level, and their upper ends are at the same level.

5. A carousel according to claim 4, wherein the means for driving comprises an electric motor and a flexible drive rod which engages an end of at least one of the scroll conveyors.

6. A carousel according to claim 5, wherein said flexible drive rod passes through said second scroll conveyor and is drivingly connected to the first mentioned scroll conveyor.

7. A carousel according to claim 2, wherein said first mentioned gravity return means comprises an uppermost section and a lowermost section, which sections overlap vertically, said uppermost section extending from an upper end of the first mentioned scroll conveyor to a position overlapping an end of the lowermost section, and said lowermost section leads to the lower end of the second scroll conveyor and overlaps same, so that as the hangers drop from said lowermost section, they fall on to the lower end of the second scroll conveyor.

8. A carousel according to claim 1 or 2 or 3, comprising sensing means for sensing specific articles on the carousel, whereby such information sensed can be used for automatically operating the discharge means.

* * * * *